(12) United States Patent
La Rosa et al.

(10) Patent No.: US 12,471,545 B2
(45) Date of Patent: Nov. 18, 2025

(54) ENERGY-AUTONOMOUS BATTERY-FREE SYSTEM FOR SMART IRRIGATION

(71) Applicant: STMicroelectronics S.r.l., Agrate Brianza (IT)

(72) Inventors: Roberto La Rosa, Catania (IT); Luigi Malpighi, Milan (IT); Pio Quarticelli, Merate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 571 days.

(21) Appl. No.: 17/835,388

(22) Filed: Jun. 8, 2022

(65) Prior Publication Data

US 2023/0397553 A1   Dec. 14, 2023

(51) Int. Cl.
| | |
|---|---|
| *A01G 25/16* | (2006.01) |
| *H02K 7/18* | (2006.01) |
| *H02N 2/18* | (2006.01) |

(52) U.S. Cl.
CPC ......... *A01G 25/167* (2013.01); *H02K 7/1823* (2013.01); *H02N 2/185* (2013.01)

(58) Field of Classification Search
CPC .... A01G 25/16; A01G 25/165; A01G 25/167; B05B 1/3006; H02J 17/00; H02J 5/005;

(Continued)

(56) References Cited

U.S. PATENT DOCUMENTS

| | | | | | |
|---|---|---|---|---|---|
| 4,496,845 | A | * | 1/1985 | Ensign | ..... F03B 15/12 |
| | | | | | 290/43 |
| 2014/0365021 | A1 | * | 12/2014 | Workman | ..... A01G 25/16 |
| | | | | | 324/546 |

(Continued)

FOREIGN PATENT DOCUMENTS

| | | |
|---|---|---|
| CN | 105123437 A | 12/2015 |
| CN | 109716642 A | 5/2019 |
| JP | 2011226260 A | 11/2011 |

OTHER PUBLICATIONS

CN First Office Action and Search Report for counterpart CN Appl. No. 202310667186.5, report dated May 22, 2025, 7 pgs.

(Continued)

*Primary Examiner* — Christopher R Dandridge
(74) *Attorney, Agent, or Firm* — Crowe & Dunlevy LLC

(57) ABSTRACT

An irrigation system includes a first valve fluidly-coupled between an inlet pipe and an outlet pipe, and a second valve fluidly-coupled between the inlet pipe and a power harvester. The power harvester generates electrical power at a power output in response to fluid flowing therethrough. An energy storage unit is coupled to the power output to store generated voltage. Comparison circuitry compares the generated voltage to a threshold. Control circuitry causes the second valve to permit fluid to flow therethrough when the generated voltage is less than the threshold, causing generation of the electrical power by the power harvester when the generated voltage is less than the threshold. The comparison circuitry causes the second valve to prevent fluid flow when the generated voltage is at least equal to threshold, ceasing generation of the electrical power by the power harvester when the generated voltage is at least equal to the threshold.

17 Claims, 6 Drawing Sheets

(58) Field of Classification Search
CPC .... B60L 11/182; H02K 7/1823; H02N 2/185; H01F 38/14
See application file for complete search history.

(56) References Cited

U.S. PATENT DOCUMENTS

2015/0226177 A1    8/2015  DeFrank et al.
2020/0386202 A1*  12/2020  Abe ................... F03B 15/08

OTHER PUBLICATIONS

Farsens: Smart Irrigation—Farsens IoT Wireless Sensors, 2019, 4 pgs.
Slabunov, V. V., et al.: Autonomous Power Supply of Sprinkler Equipment Through the Use of a Micro-Hydropower Station [2021], 2021, 15 pgs.
Battery-Free Wireless Sensing for Smart Agriculture, by ON Semiconductor, Dec. 19, 2017.

* cited by examiner

ENERGY-AUTONOMOUS BATTERY-FREE SYSTEM FOR SMART IRRIGATION

TECHNICAL FIELD

This disclosure is related to the field of smart irrigation and, more particularly, to a smart irrigation system that utilizes water flow to provide electrical power for the electronics that control the valves of the system.

BACKGROUND

Smart irrigation systems for agriculture are complex systems, extending over large areas of agricultural land. Such smart irrigation systems utilize electronic control units to provide for precisely controlled water delivery. Delivery of the electrical power utilized by such electronic control units can be a challenge.

For example, due to these large areas of land over which smart irrigation systems are utilized, as well as the fact that such agricultural land is typically remotely located, the connection of such electronic control units to the power distribution grid is impractical or impossible. In addition, the usage of rechargeable batteries that are recharged by solar panels is less than ideal because solar panels located in remote locations may be stolen, and as stated agricultural land typically is remotely located. Still further, while the usage of batteries that are hidden or buried is possible to avoid theft, such batteries are to be manually removed and recharged off site. This is rather labor intensive, leaving this approach also less than ideal.

As such, further development into the area of smart irrigation systems is needed.

SUMMARY

Disclosed herein is an irrigation system, including an inlet pipe configured to receive pressurized water, a first controllable valve having a first valve inlet coupled in fluid communication with the inlet pipe to receive the pressurized water therefrom and having a first valve outlet coupled in fluid communication with an outlet pipe, a first valve driver configured to control the first controllable valve in response to a first control signal, a second controllable valve having a second valve inlet coupled in fluid communication with the inlet pipe to receive the pressurized water and having a second valve outlet, and a second valve driver configured to control the second controllable valve in response to a second control signal. A power harvester has a harvester inlet coupled in fluid communication with the second valve outlet and having a harvester outlet coupled in fluid communication with a drain pipe, the power harvester configured to generate electrical power at a power output in response to pressurized water flowing therethrough.

An energy storage unit is electrically coupled between the power output and ground and configured to store a generated voltage thereacross. Comparison circuitry is configured to compare the generated voltage to at least one threshold and to generate at least one comparison output signal indicating whether the generated voltage is greater than the at least one threshold and whether the generated voltage is less than the at least one threshold. Control circuitry is configured to generate the second control signal such that the second valve driver causes the second controllable valve to permit the pressurized water to flow therethrough when the comparison circuitry indicates that the generated voltage is less than the at least one threshold, thereby causing generation of the electrical power by the power harvester when the comparison circuitry indicates that the generated voltage is less than the at least one threshold, and to generate the second control signal such that the second valve driver causes the second controllable valve to prevent the pressurized water from flowing therethrough when the comparison circuitry indicates that the generated voltage is at least equal to the at least one threshold, thereby ceasing generation of the electrical power by the power harvester when the comparison circuitry indicates that the generated voltage is at least equal to than the at least one threshold.

The control circuitry may be configured to generate the first control signal such that the first valve driver causes the first controllable valve to permit the pressurized water to flow therethrough when delivery of water to an area associated with the irrigation system is desired. In addition, a communication interface may be coupled to the control circuitry, and the communication interface may receive commands related to delivery of water to the area associated with the irrigation system, with the control circuitry being configured to generate the first control signal such that the first valve driver causes the first controllable valve to permit the pressurized water to flow therethrough based upon commands received by the communication interface.

An environment sensor may be coupled to the control circuitry, and the environment sensor may generate and send signals to the control circuitry indicative of whether delivery of water to the area associated with the irrigation system should commence. The control circuitry may be configured to generate the first control signal such that the first valve driver causes the first controllable valve to permit the pressurized water to flow therethrough based upon the signals generated by the environment sensor.

The communication interface may be a wireless communication interface.

A sense circuit may be configured to generate a sense signal indicative of the generated voltage, and the comparison circuitry may compare the generated voltage to the at least one threshold by comparing the sense signal to the at least one threshold.

The sense circuit may be a voltage divider coupled between the power output and ground, with the sense signal being generated as a sense voltage at a tap of the voltage divider.

The power harvester may be configured to utilize vibrations induced in at least the harvester inlet to generate the electrical power at the power output.

The comparison circuitry may be at least one comparator configured to compare the generated voltage to the at least one threshold and generate the at least one comparison output signal as indicating whether the generated voltage is greater than the at least one threshold and as indicating whether the generated voltage is less than the at least one threshold.

An analog to digital converter may be configured to generate a digital value representative of the generated voltage, and the comparison circuitry and control circuitry may be integrated within a microcontroller.

A voltage converter may be configured to receive the generated voltage and to produce a converted voltage therefrom, and the first and second vale drivers may be powered by the converted voltage.

A voltage regulator may be configured to receive the converted voltage and producing a regulated voltage therefrom, and the control circuitry may be powered by the regulated voltage.

The at least one threshold may include a lower threshold and an upper threshold, and the at least one comparison output signal may include first and second comparison signals, with the comparison circuitry being configured to compare the generated voltage to the lower threshold and assert the first comparison signal when the generated voltage is less than the lower threshold. The comparison circuitry may be configured to compare the generated voltage to the upper threshold and assert the second comparison signal when the generated voltage is greater than the upper threshold. The control circuitry may be configured to generate the second control signal such that the second valve driver causes the second controllable valve to permit the pressurized water to flow therethrough in response to assertion of the first comparison signal. The control circuitry may be configured to generate the first control signal such that the second valve driver causes second controllable valve to prevent the pressurized water from flow therethrough in response to assertion of the second comparison signal.

Also disclosed herein is a method of extending maintenance interval of a smart irrigation system including a first controllable valve coupled in fluid communication between a system inlet pipe and a system outlet pipe. The method includes fluidly coupling a second controllable valve between the system inlet and a power harvester such that fluid flows from the system inlet into the power harvester when the second controllable valve is open, with the power harvester generating power when fluid flows therethrough, storing the power generated by the power harvester, monitoring the stored power, opening the second controllable valve when the stored power is insufficient for system operation, and closing the second controllable valve when the stored power is sufficient for system operation such that the power harvester is not in operation when the stored power is sufficient for system operation.

Storing the power generated by the power harvester may be storing power generated by the power harvester as voltage across a supercapacitor.

Monitoring the stored power may be monitoring the voltage stored across the supercapacitor.

The stored power may be insufficient for system operation when the voltage stored across the supercapacitor falls below a lower threshold.

The stored power may be sufficient for system operation when the voltage stored across the supercapacitor rises to become equal to a higher threshold.

The method may further include opening the first controllable valve based upon a command received via a communications interface.

The stored power may be insufficient for system operation when a divided version of the voltage stored across the supercapacitor falls below a lower threshold, and the stored power may be sufficient for system operation when the divided version of the voltage stored across the supercapacitor rises to become equal to a higher threshold.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
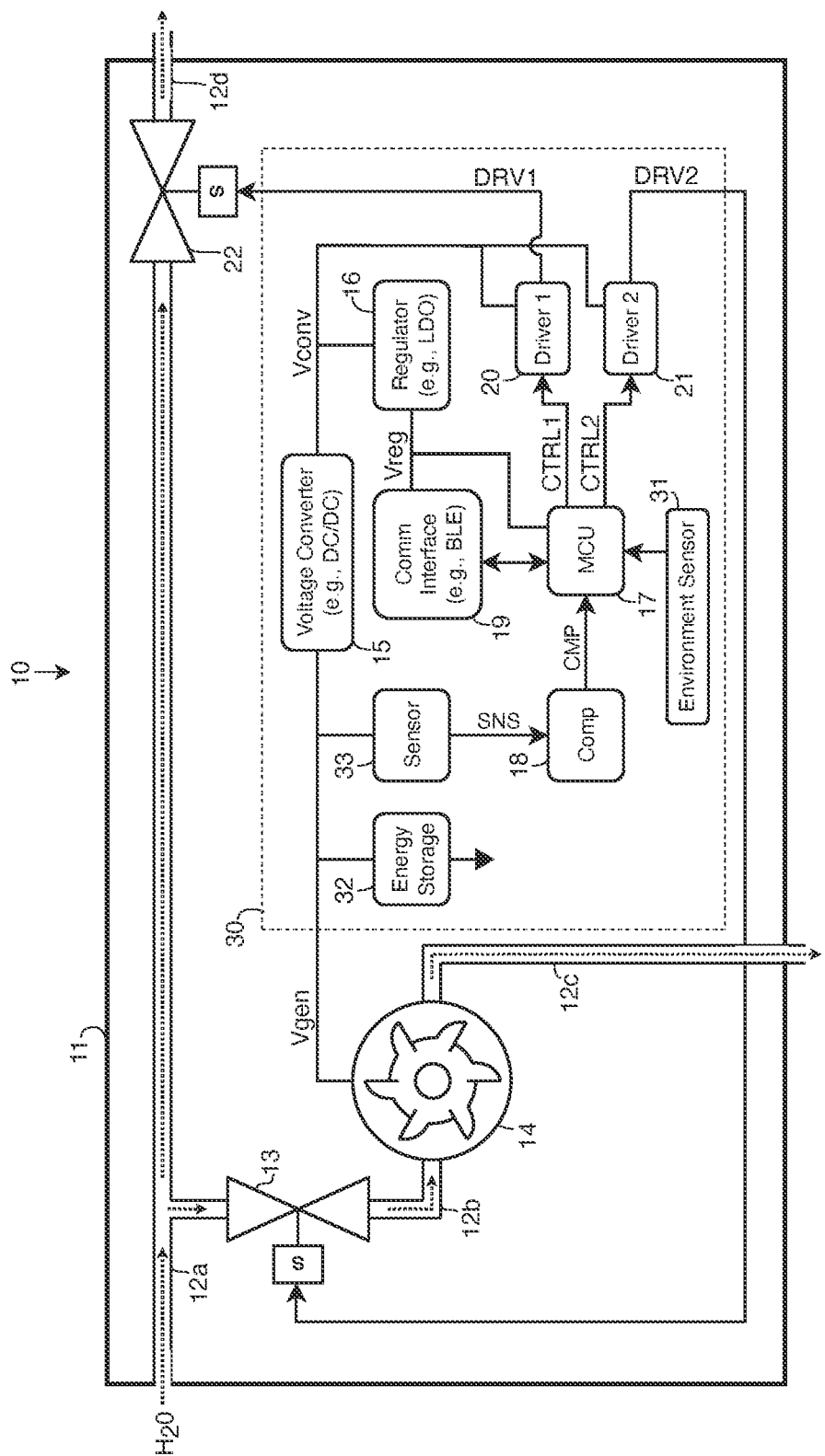
FIG. 1 is a schematic block diagram of a first smart irrigation system disclosed herein.

A first smart irrigation system 10 is now described with reference to FIG. 1. The smart irrigation system 10 is contained within an environmentally resistant housing 11. Fluid piping 12 includes an inlet pipe 12a through which pressurized water enters the housing 11. A first solenoid valve 22 has an inlet that is coupled in fluid communication with the inlet pipe 12a and an outlet that is coupled in fluid communication with an outlet pipe 12d through which pressurized water exits the housing 13, with the actuation of the first solenoid valve 22 being selectively controlled by a drive signal DRV1. Through proper driving of the first solenoid valve 22, the flow of water through the output pipe 12d can be controlled in a range from zero flow to maximum flow. This output pipe 12d may be connected to a water distribution device, such as a sprinkler, to achieve desired watering of the agricultural land on which the smart irrigation system 10 is installed.

A second solenoid valve 13 has an inlet that is coupled in fluid communication with the inlet pipe 12a and an outlet that is coupled in fluid communication with a harvester inlet pipe 12b, with the actuation of the second solenoid valve being controlled by a drive signal DRV2. A power harvester 14 (e.g., a water turbine that generates electrical power, or a device that utilizes piezoelectric, electromagnetic, or electrostatic approaches to exploit vibrations induced by the water flow in the pipes to generate electrical power) is fluidly connected between the harvester inlet pipe 12b and a harvester outlet pipe 12c. In this embodiment, the harvester outlet pipe 12c exits the housing 11 and may be arranged to simply drain onto or into the ground, or into a collection tank. Through proper driving of the second solenoid valve 13, the amount of fluid flow through the power harvester 14 can be controlled in a range from zero flow to maximum flow.

Although the valves 22 and 13 are described above and below as being solenoid valves, the valves may be of any type.

Flow of pressured water from the inlet 12a, through the solenoid valve 13, through the harvester inlet pipe 12b, through the power harvester 14 itself, and out through the harvester outlet pipe 12c results in generation of electrical power by the power harvester 14, such as DC electrical power. The current output by the power harvester 14 during power generation is used to charge an energy storage element 32 connected between the power output terminal of the power harvester 14 and ground, with a generated voltage Vgen therefore being generated across the energy storage element 32.

A sensor 33 is connected between the power output terminal of the power harvester 14 and ground, with a sense signal SNS being generated by the sensor 33. A comparison circuit 18 receives the sense signal SNS as input and outputs a comparison output CMP at its output indicating whether the sense signal SNS is above or below a threshold value.

A voltage converter 15 (e.g., a DC/DC voltage converter, such as a low dropout regulator) receives the generated voltage Vgen and provides a converted voltage Vconv to a voltage regulator 16 (e.g., a low dropout regulator), as well as to valve drivers 20 and 21. The voltage regulator 16 outputs a regulated voltage Vreg to power a communication interface 19 (e.g., Bluetooth low energy transceiver) and a microcontroller 17. The communication interface 19 is in bidirectional communication with the microcontroller 17, and the microcontroller receives the comparison output CMP, as well as the output of an optional environment sensor 31 or sensors (e.g., moisture sensor), as input, and respectively provides output control signals CTRL1 and CTRL2 to the valve drivers 20 and 21.

In particular, the output control signal CTRL1 is provided by the microcontroller 17 based upon internal programming, based upon data from the environment sensor 31, or based upon data received via the communications interface 19. The driver 20 generates the drive signal DRV1 for the first solenoid valve 22 from the control signal CTRL1. Since the first solenoid valve 22 is used to regulate flow of water to a water distribution device, the control signal CTRL1 therefore controls the flow of water to the water distribution device.

The output control signal CTRL2 is provided by the microcontroller 17 based upon the comparison output CMP to thereby control the flow of water through the solenoid valve 13 and in turn the power harvester 14—thus, the output control signal CTRL2 controls the generation of power by the power harvester 14. Since the power harvester 14 may have moving parts (e.g., consider the case of a water turbine) and since moving parts wear out over time, out of a desire to extend maintenance intervals of the smart irrigation system 10 to be as long as possible, it is desired for the power harvester 14 to be moving/operating as infrequently as possible. Therefore, the microcontroller 17 uses the sensor 33 to monitor the status of the voltage Vgen across the energy storage device 32, and uses the comparison circuit 18 to determine when the voltage Vgen across the energy storage device falls below and rises above a threshold or thresholds. When the microcontroller 17 has determined that the voltage Vgen across the energy storage device 32 has fallen below the threshold or thresholds (e.g., falls below a first threshold), the microcontroller 17 generates the control signal CTRL2 so as to cause the driver 21 to generate the drive signal DRV2 in such a fashion to control the solenoid valve 13 to permit flow of water through the harvester 14 to thereby generate power which is used to recharge the energy storage device 32. When the voltage Vgen across the energy storage device 32 rises above the threshold or thresholds (e.g., rises above a second threshold that is a higher value than the first threshold) as a result of the recharging provided by power generation by the harvester 14, the microcontroller 17 generates the control signal CTRL2 so as to cause the driver 21 to generate the drive signal DRV2 in such a fashion to close the solenoid valve 13 to cease the flow of water through the harvester 14, thereby stopping operation of the harvester 14 once the energy storage device 32 is sufficiently charged. This reduces the operation time of the harvester 14 to a minimum, thereby increasing the useful life of the harvester 14 and increasing the maintenance intervals of the smart irrigation system 10 since the solenoid valve 13 opens to permit water to flow through the harvester 14 when charging of the energy storage device 32 is desired, and water is otherwise not permitted to flow through the harvester 14.

Figure 2:
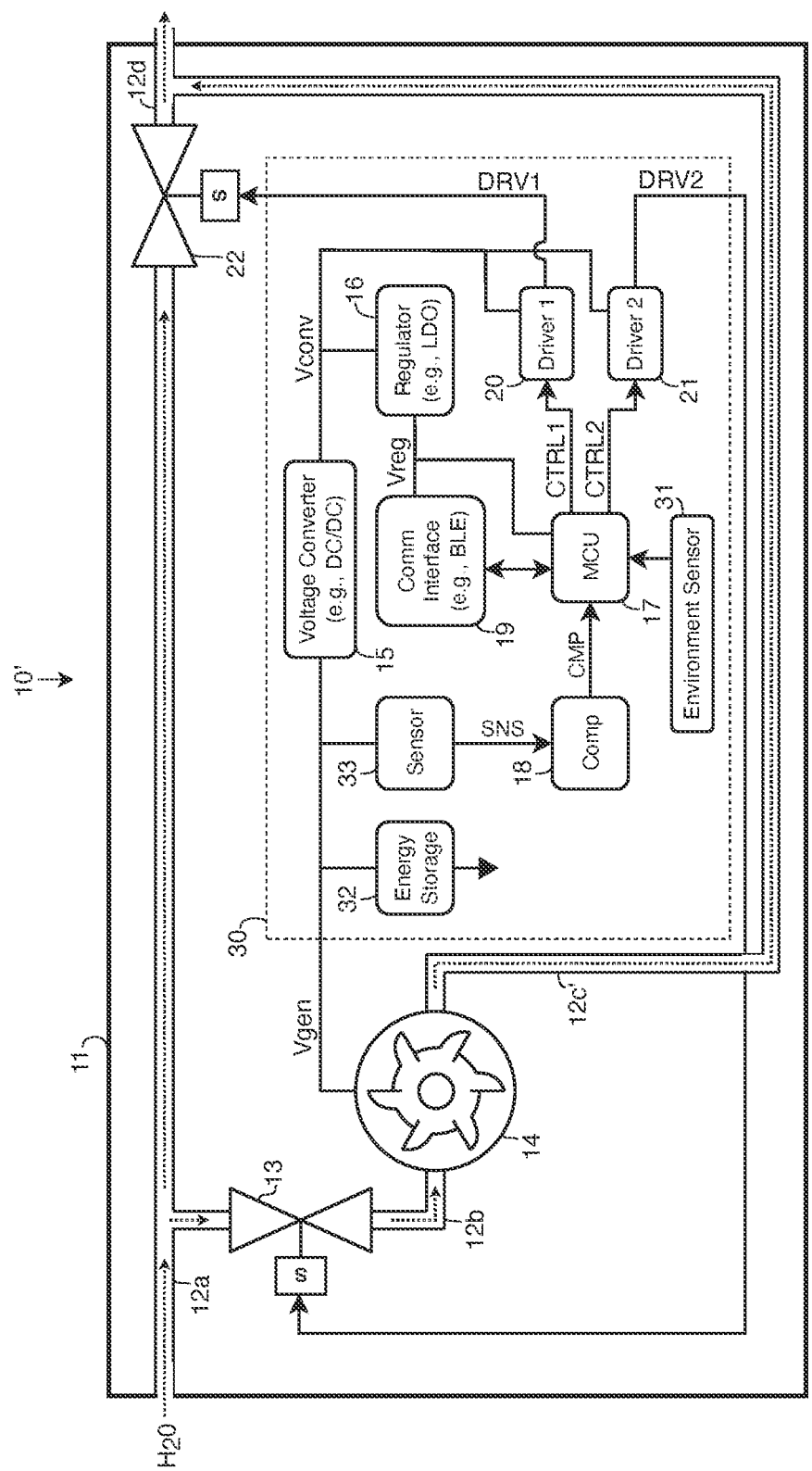
FIG. 2 is a schematic block diagram of a second smart irrigation system disclosed herein.

In another configuration, the harvester output pipe 12c' may be connected to the outlet pipe 12d as shown in FIG. 2.

Figure 3:
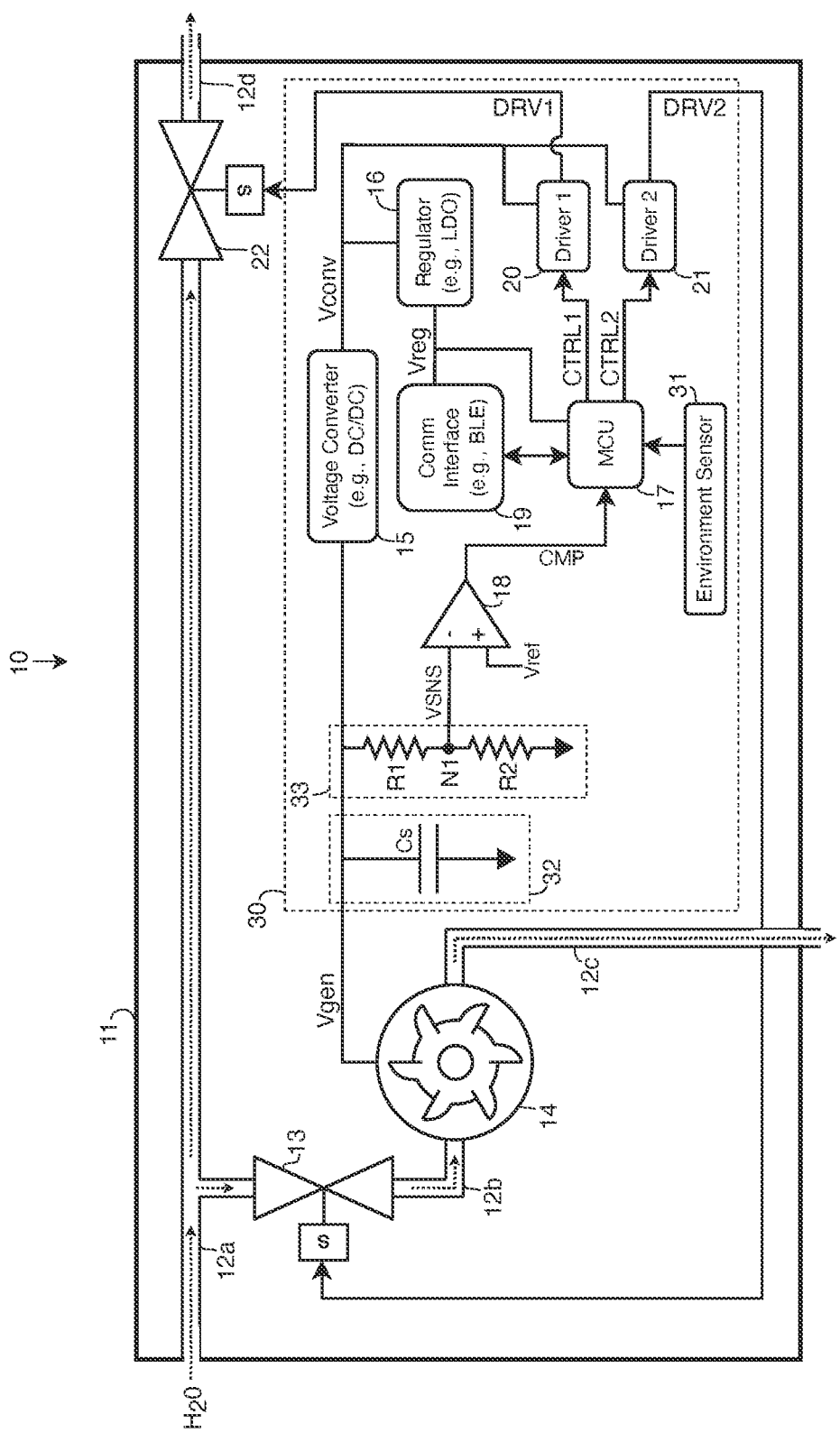
FIG. 3 is a schematic block diagram of the first smart irrigation system in which first potential implementation details of the energy storage element, sensor, and comparison circuit are shown.

Another possible implementation option is now described with reference to FIG. 3. The energy storage device 32 may be a supercapacitor Cs. In addition, the sensor 33 may be a resistive divider formed by series-connected resistors R1 and R2 is connected between the power output terminal of the power harvester 14 and ground, with a sense voltage VSNS being generated at the tap N1 between resistor R1 and R2. The comparison circuit 18 may be a comparator having an inverting input terminal connected to receive the sense voltage VSNS, a non-inverting input terminal connected to receive a reference voltage Vref1, and an output at which the comparison output CMP is generated and passed to the microcontroller 17. Here, when VSNS falls below the reference voltage Vref1, the comparison circuit 18 asserts the comparison output CMP, and when VSNS rises above the reference voltage Vref1, the comparison circuit 18 deasserts the comparison output CMP.

Figure 4:
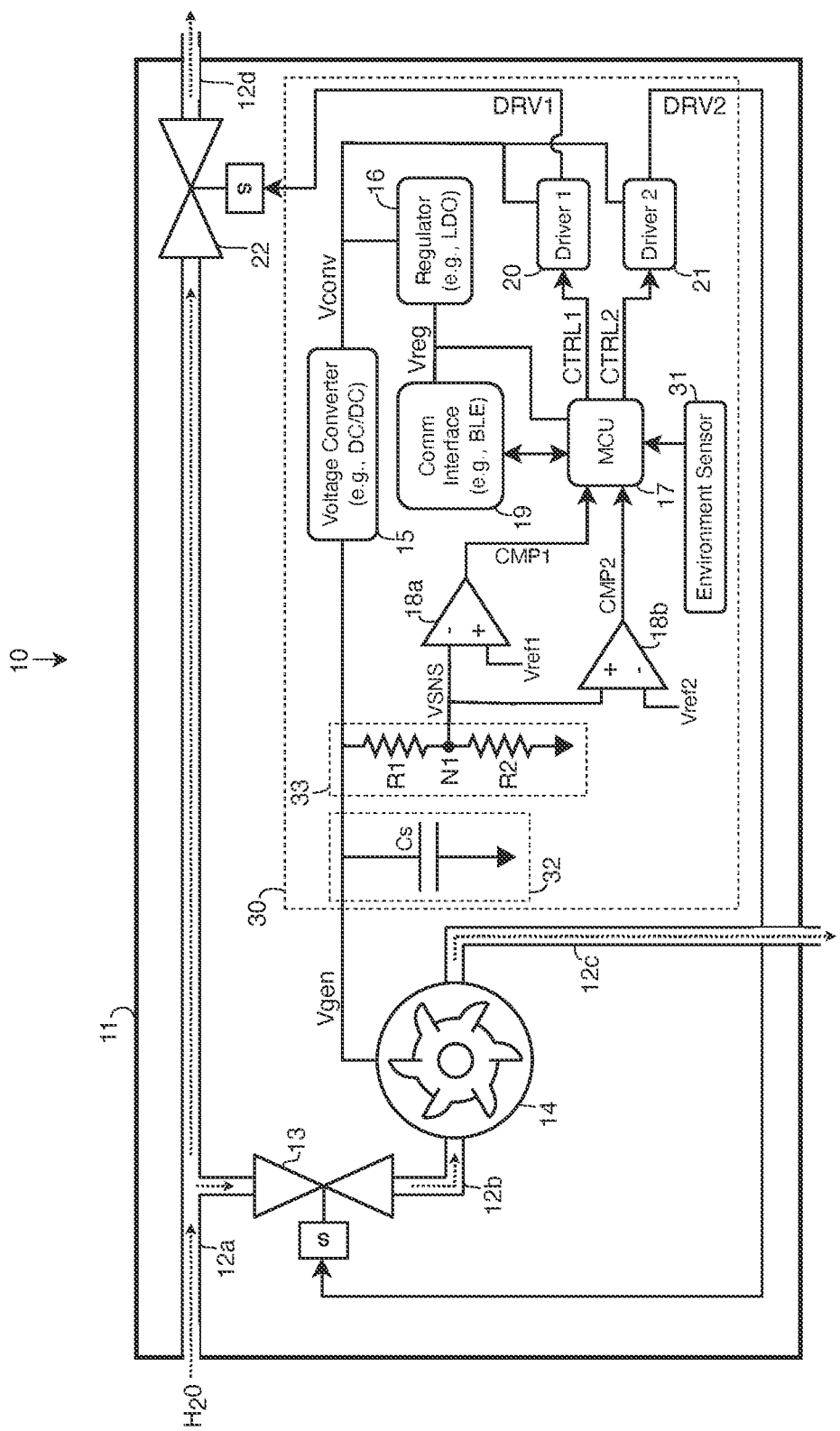
FIG. 4 is a schematic block diagram of the first smart irrigation system in which second potential implementation details of the energy storage element, sensor, and comparison circuit are shown.

Yet another possible implementation option is now described with reference to FIG. 4. The energy storage device 32 may be a supercapacitor Cs. In addition, the sensor 33 may be a resistive divider formed by series-connected resistors R1 and R2 is connected between the power output terminal of the power harvester 14 and ground, with a sense voltage VSNS being generated at the tap N1 between resistor R1 and R2. The comparison circuit includes a first comparator 18a having a non-inverting input terminal connected to receive the sense voltage VSNS, an inverting input terminal connected to receive a reference voltage Vref2 (which is higher than the Vref1), and an output at which the comparison output CMP2 is generated and passed to the microcontroller 17. Here, when VSNS rises above the reference voltage Vref2, the comparison circuit 18a asserts the comparison output CMP2.

The comparison circuit includes a second comparator 18b having a non-inverting input terminal connected to receive the sense voltage VSNS, an inverting input terminal connected to receive a reference voltage Vref2, and an output at which the comparison output CMP2 is generated and passed to the microcontroller 17. Here, when VSNS falls below the reference voltage Vref1, the comparison circuit 18a asserts the comparison output CMP1.

As stated, the reference voltage Vref1 is lower than the reference voltage Vref2. Therefore, the microcontroller 17 initiates power generation when the comparison output CMP1 is asserted—power generation is initiated when the voltage Vgen has fallen below a lower threshold. The microcontroller 17 then ceases power generation when the comparison output CMP2 is asserted—power generation is ceased when the voltage Vgen has increased to match or exceed a higher threshold.

Figure 5:
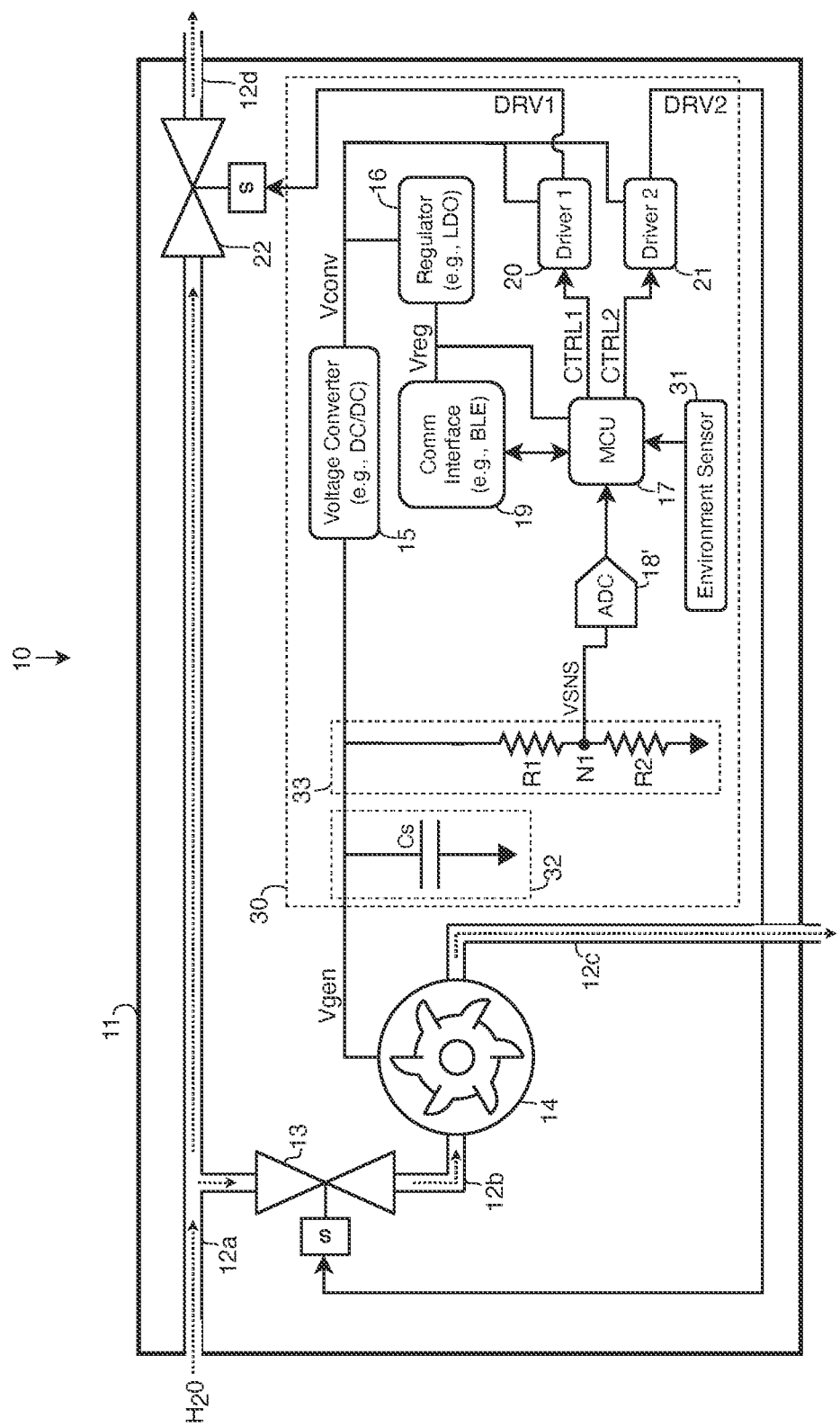
FIG. 5 is a schematic block diagram of the first smart irrigation system in which third potential implementation details of the energy storage element, sensor, and comparison circuit are shown.

Instead of using comparators, an analog to digital converter (ADC) 18' may be used to digitize VSNS, as shown in FIG. 5. In this case, the microcontroller 17 receives the digitized version of VSNS from the ADC 18', performs the above-described comparisons to a stored threshold value or stored threshold values, and based upon the comparisons, initiates and causes power generation accordingly as described above.

Figure 6:
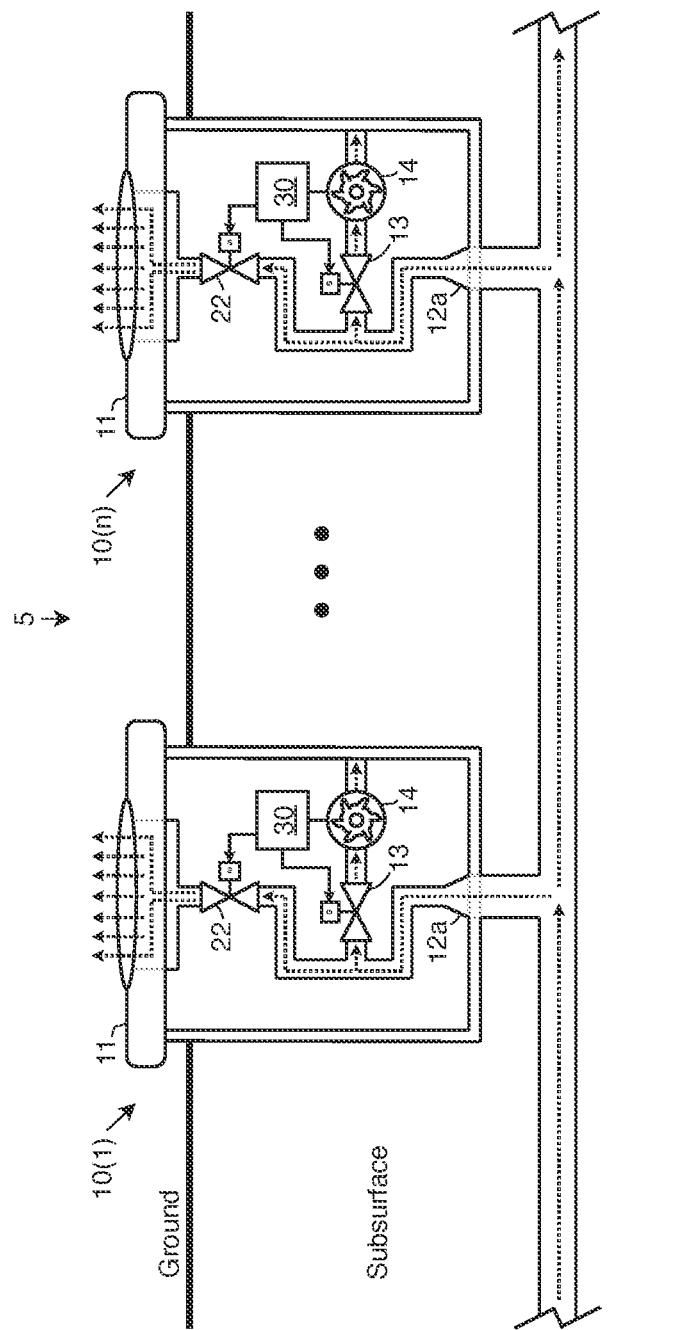
FIG. 6 is a diagrammatical block diagram of a smart lawn sprinkler system incorporating multiple instances of the first smart irrigation system of FIG. 1.

The housing 11 of the smart irrigation system 10 may be small and sized so as to fit in a typical hole formed in the ground to contain a sprinkler, and the other components of the smart irrigation system 10 may be accordingly sized to fit within the housing when it is so sized. Therefore, multiple instances of the smart irrigation system, shown in FIG. 6 as smart irrigation systems 10(1), . . . , 10(n) may be installed within a single field and receive water from a same water pipe. Here, the environment sensor 31 may be a moisture sensor. This permits the formation of a smart sprinkler system 5, shown in FIG. 6, which waters the parts of the field (e.g., a lawn) that are dry (since each smart irrigation system 10(1) . . . , 10(n) turns on or off based on its moisture sensor), thereby saving a large amount of water by avoiding watering areas of the field that are sufficiently moist.

Modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An irrigation system, comprising: an inlet pipe configured to receive pressurized water; a first controllable valve having a first valve inlet coupled in fluid communication with the inlet pipe to receive the pressurized water therefrom and having a first valve outlet coupled in fluid communication with an outlet pipe; a first valve driver configured to control the first controllable valve in response to a first control signal; a second controllable valve having a second valve inlet coupled in fluid communication with the inlet pipe to receive the pressurized water and having a second valve outlet; a second valve driver configured to control the second controllable valve in response to a second control signal; a power harvester having a harvester inlet coupled in fluid communication with the second valve outlet and having a harvester outlet coupled in fluid communication with a drain pipe, the power harvester configured to generate electrical power at a power output in response to pressurized water flowing therethrough; an energy storage unit electrically coupled between the power output and ground and configured to store a generated voltage thereacross; comparison circuitry configured to compare the generated voltage to at least one threshold and to generate at least one comparison output signal indicating whether the generated voltage is greater than the at least one threshold and whether the generated voltage is less than the at least one threshold; and control circuitry configured to:

generate the second control signal such that the second valve driver causes the second controllable valve to permit the pressurized water to flow therethrough when the comparison circuitry indicates that the generated voltage is less than the at least one threshold, thereby causing generation of the electrical power by the power harvester when the comparison circuitry indicates that the generated voltage is less than the at least one threshold; and generate the second control signal such that the second valve driver causes the second controllable valve to prevent the pressurized water from flowing therethrough when the comparison circuitry indicates that the generated voltage is at least equal to the at least one threshold, thereby ceasing generation of the electrical power by the power harvester when the comparison circuitry indicates that the generated voltage is at least equal to or greater than the at least one threshold.

2. The irrigation system of claim 1, wherein the control circuitry is configured to generate the first control signal such that the first valve driver causes the first controllable valve to permit the pressurized water to flow therethrough when delivery of water to an area associated with the irrigation system is desired.

3. The irrigation system of claim 2, further comprising a communication interface coupled to the control circuitry; wherein the communication interface receives commands related to delivery of water to the area associated with the irrigation system; and wherein the control circuitry is configured to generate the first control signal such that the first valve driver causes the first controllable valve to permit the pressurized water to flow therethrough based upon commands received by the communication interface.

4. The irrigation system of claim 2, further comprising an environment sensor coupled to the control circuitry; wherein the environment sensor generates and sends signals to the control circuitry indicative of whether delivery of water to the area associated with the irrigation system should commence; and wherein the control circuitry is configured to generate the first control signal such that the first valve driver causes the first controllable valve to permit the pressurized water to flow therethrough based upon the signals generated by the environment sensor.

5. The irrigation system of claim 3, wherein the communication interface comprises a wireless communication interface.

6. The irrigation system of claim 1, further comprising a sense circuit configured to generate a sense signal indicative of the generated voltage; and wherein the comparison circuitry compares the generated voltage to the at least one threshold by comparing the sense signal to the at least one threshold.

7. The irrigation system of claim 6, wherein the sense circuit comprises a voltage divider coupled between the power output and ground, with the sense signal being generated as a sense voltage at a tap of the voltage divider.

8. The irrigation system of claim 1, wherein the power harvester is configured to utilize vibrations induced in at least the harvester inlet to generate the electrical power at the power output.

9. The irrigation system of claim 1, wherein the comparison circuitry comprises at least one comparator configured to compare the generated voltage to the at least one threshold and generate the at least one comparison output signal as indicating whether the generated voltage is greater than the at least one threshold and as indicating whether the generated voltage is less than the at least one threshold.

10. The irrigation system of claim 1, further comprising an analog to digital converter configured to generate a digital value representative of the generated voltage; and wherein the comparison circuitry and control circuitry are integrated within a microcontroller.

11. The irrigation system of claim 1, further comprising a voltage converter configured to receive the generated voltage and to produce a converted voltage therefrom; and wherein the first and second valve drivers are powered by the converted voltage.

12. The irrigation system of claim 11, further comprising a voltage regulator configured to receive the converted voltage and producing a regulated voltage therefrom; and wherein the control circuitry is powered by the regulated voltage.

13. The irrigation system of claim 1, wherein the at least one threshold comprises a lower threshold and an upper threshold; wherein the at least one comparison output signal comprises first and second comparison signals; wherein the comparison circuitry is configured to compare the generated voltage to the lower threshold and assert the first comparison signal when the generated voltage is less than the lower threshold; wherein the comparison circuitry is configured to compare the generated voltage to the upper threshold and assert the second comparison signal when the generated voltage is greater than the upper threshold; wherein the control circuitry is configured to generate the second control signal such that the second valve driver causes the second controllable valve to permit the pressurized water to flow therethrough in response to assertion of the first comparison signal; and wherein the control circuitry is configured to generate the first control signal such that the second valve driver causes second controllable valve to prevent the pressurized water from flow therethrough in response to assertion of the second comparison signal.

14. The irrigation system of claim 1, wherein the control circuitry is configured to implement a hysteresis band for the at least one threshold to prevent rapid cycling of the second controllable valve.

15. The irrigation system of claim 1, wherein the power harvester comprises a micro-hydro turbine.

16. The irrigation system of claim 1, wherein the energy storage unit comprises a supercapacitor.

17. The irrigation system of claim 3, wherein the control circuitry is further configured to communicate system status and energy levels via the communication interface to a remote device.

* * * * *